June 9, 1925.
R. DE O. McDILL
MACHINE FOR APPLYING A LIQUID COATING OR
PRESERVATIVE TO THE SKIN OF FRUIT
Original Filed June 10, 1922
1,540,791
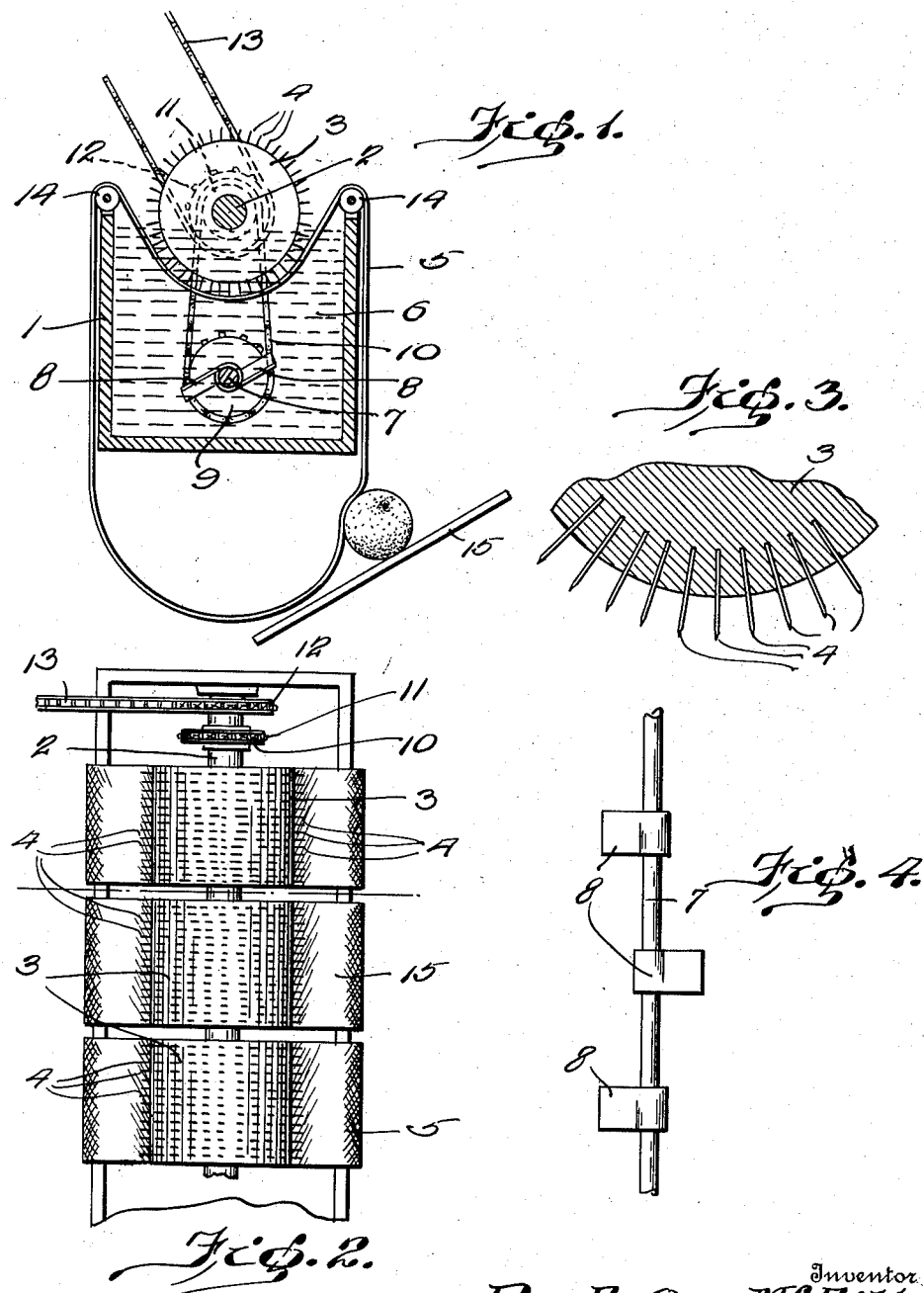

Patented June 9, 1925.

1,540,791

UNITED STATES PATENT OFFICE.

REX DE ORE McDILL, OF CIENFUEGOS, CUBA.

MACHINE FOR APPLYING A LIQUID COATING OR PRESERVATIVE TO THE SKIN OF FRUIT.

Application filed June 10, 1922, Serial No. 567,372. Renewed February 9, 1925.

*To all whom it may concern:*

Be it known that I, REX DE ORE McDILL, a citizen of the United States, and a resident of Cienfuegos, in the Province of Santa Clara, Cuba, have invented a new and useful Machine for Applying a Liquid Coating or Preservative to the Skin of Fruit.

The object of my invention is to provide novel apparatus for rapidly and evenly applying a suitable water repelling liquid coating or preservative to the surface of the skin of fruit and which is adapted to handle large quantities of fruit with rapidity. It is also my object to provide in such a machine novel means for constantly stirring up the mixture forming the liquid coating; and to provide the novel combination and arrangement of parts hereinafter disclosed. I attain these and other objects of my invention by the mechanism illustrated in the accompanying drawings, in which—

Figure 1 is a vertical transverse section of my invention;

Fig. 2 is a top plan of same;

Fig. 3 is an enlarged detail sectional view of the spiked roller; and

Fig. 4 is an enlarged detail view of the agitator 7.

Like numerals indicate like parts in each of the several views.

Referring to the accompanying drawings I provide a suitable tank 1 having suitable rollers 14 mounted on its longitudinal edges. I further provide a roller 3 having a multiplicity of spikes 4 having their points protruding through the surface of the rollers. Roller 3 is mounted on a suitable shaft 2, which also carries a pulley or sprocket 12 driven by a suitable belt or chain 13 from some suitable source of power. I further provide a second pulley or sprocket 11 mounted on roller shaft 2, said sprocket driving the belt or chain 10 which in turn drives the sprocket or pulley 9 on the agitator shaft 7. Shaft 7 has a plurality of spaced agitator paddles 8 adapted to keep the ingredients of the liquid coating continuously mixed together while the machine is in operation. I further provide a broad, absorbent fabric belt, (which may be perforated if desired) engaged by the spikes 4 of the rotating roller 2 which member propels the fabric belt through the liquid coating or preservative in the tank 1.

As shown in Fig. 1, the fruit is fed down a suitable chute 15 and into contact with the endless fabric belt 5 which extends down below the bottom of the exterior of the tank 1 and in proximity to the chute 15 as illustrated in Fig. 1.

What I claim is:

1. A machine for applying a preservative liquid coating to fruit, consisting of a tank adapted to contain a suitable water repelling liquid coating, an absorbent fabric belt, means for driving the belt, and means for agitating the liquid coating in the tank, aforesaid belt being suitably arranged to contact with and apply the preservative coating to the fruit.

2. In a machine of the class described, the combination of a tank, rollers mounted on the sides of the tank, an endless fabric belt mounted on the rollers and extending into the tank and around the underside of the tank, means for frictionally engaging the fabric belt and continuously moving same, and means for feeding fruit into contact with a portion of the fabric belt that has absorbed the liquid coating.

3. In combination with the apparatus described in claim 2, an agitator mounted in the tank, said agitator being operatively connected with the means for driving the endless fabric belt, substantially as shown.

4. In a machine of the class described, the combination of a tank containing a preservative or coating liquid for treating fruit, an endless absorbent fabric belt, a spiked roller arranged longitudinally of the tank and engaging the fabric belt to cause same to travel through the solution in the tank, means for agitating the contents of the tank, and means for feeding fruit into contact with the endless fabric belt, whereby quantities of fruit can be rapidly coated with the contents of the tank.

REX DE ORE McDILL.